(12) United States Patent
Sheth et al.

(10) Patent No.: US 8,208,814 B2
(45) Date of Patent: Jun. 26, 2012

(54) OPTICAL TRANSCEIVER CALIBRATION SYSTEM AND METHOD

(75) Inventors: Samir Sheth, Plano, TX (US); Andy James Filtness, Frisco, TX (US)

(73) Assignee: IPhotonixs, LLC, Jersey City, NJ (US)

( * ) Notice: Subject to any disclaimer, the term of this patent is extended or adjusted under 35 U.S.C. 154(b) by 1065 days.

(21) Appl. No.: 12/109,132

(22) Filed: Apr. 24, 2008

(65) Prior Publication Data

US 2008/0267621 A1 Oct. 30, 2008

Related U.S. Application Data

(60) Provisional application No. 60/926,180, filed on Apr. 25, 2007.

(51) Int. Cl.
*H04B 10/00* (2006.01)

(52) U.S. Cl. ......... 398/135; 398/136; 398/137; 398/25; 398/26; 398/27; 398/193; 398/194; 398/195; 398/196; 398/197; 398/33; 398/38; 398/158; 398/159; 372/32; 372/34; 372/36; 372/38.02; 372/29.021; 385/89; 385/90; 385/92; 385/93

(58) Field of Classification Search .................. 398/135, 398/136, 137, 138, 139, 33, 38, 25, 26, 27, 398/22, 23, 24, 164, 182, 183, 128, 130, 398/192, 193, 194, 195, 196, 197, 198, 199, 398/200, 201, 202, 208, 209, 158, 159, 162, 398/94, 95; 372/32, 34, 36, 38.02, 29.021; 385/88, 89, 90, 92, 93

See application file for complete search history.

(56) References Cited

U.S. PATENT DOCUMENTS

| | | | |
|---|---|---|---|
| 7,269,347 B1 | 9/2007 | Matricardi et al. | |
| 2002/0027688 A1 | 3/2002 | Stephenson | |
| 2002/0027690 A1 | 3/2002 | Bartur et al. | |
| 2004/0165622 A1* | 8/2004 | Lu | 372/29.021 |
| 2005/0018177 A1 | 1/2005 | Rosenberg et al. | |
| 2005/0175350 A1* | 8/2005 | Hartzell et al. | 398/135 |
| 2006/0002707 A1* | 1/2006 | Ekkizogloy et al. | 398/135 |
| 2006/0159461 A1 | 7/2006 | Nelson et al. | |
| 2006/0216040 A1 | 9/2006 | Nelson | |
| 2007/0081824 A1 | 4/2007 | Chiu et al. | |
| 2008/0187319 A1* | 8/2008 | Stewart et al. | 398/136 |

* cited by examiner

*Primary Examiner* — Hanh Phan
(74) *Attorney, Agent, or Firm* — Slater & Matsil, L.L.P.

(57) ABSTRACT

An optical transceiver calibration system and manufacturing method to fabricate a dual closed loop control transceiver are provided. The calibration system and method includes measuring an operating temperature and determining operational parameters based upon the operating temperature. The operational parameters may include, for example, a target power for transmitting a digital one, a target power for transmitting a digital zero, a modulation current, and a bias current. A bias may be added to the temperature to account for the difference between the temperature at the temperature sensor and the optical equipment. The operational parameters are preferably calculated independently of each other and are used as initial values during operating modes and allow the control loop to converge more quickly. The optics data is may be scanned electronically via bar code or some other electronic format prior to test. The software residing on the module then calibrates and configures the transceiver.

18 Claims, 5 Drawing Sheets

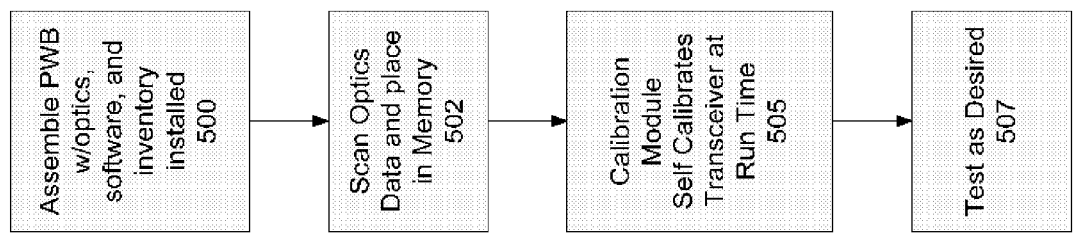

OPTICAL TRANSCEIVER CALIBRATION SYSTEM AND METHOD

This application claims the benefit of U.S. Provisional Application No. 60/926,180 filed on Apr. 25, 2007, entitled "Calibration Method and Process for a Dual Closed Loop Control Transceiver in a GPON Optical Network," which application is hereby incorporated herein by reference.

TECHNICAL FIELD

The present invention relates generally to optical networks and, more particularly, to a system and method for calibrating optical networking equipment.

BACKGROUND

A passive optical network (PON) includes an optical line terminal (OLT) and multiple optical network terminals (ONTs) connected together using a passive optical splitter over a single fiber. The ONT transmits data at one wavelength (such as 1310 nm) and receives data at another wavelength (such as 1490 nm), and the OLT does the opposite. Optionally, a video channel may be transmitted between the OLT and ONT at yet another wavelength (such as 1550 nm). Because multiple ONTs may simultaneously transmit to one OLT, the data is typically time division multiplexed, wherein each ONT is assigned time slots at which it can transmit on the PON without colliding with other ONTs. Therefore, the ONT generally requires a burst mode transmitter that communicates with a burst mode receiver on the OLT.

The link performance of a PON system is dependent upon the characteristics of the output optical waveform from the terminals and is particularly important for the ONT because the ONT transmitter operates in burst mode. Standards, such as the G.984.2 standard, have been promulgated in order to assure interoperability among equipment manufacturers. The G.984.2 standard, among other things, defines standards for the output optical waveform.

Generally, there are two types of OLTs: RESET and RESETless. The RESET-based OLTs adjust the threshold between bursts, whereas the RESETless-based OLTs have a relatively low threshold. Therefore, RESETLESS-based OLTs generally require a high extinction ratio and fast rise and fall times in excess of the G.984.2 standard in order to achieve error free upstream burst mode communications from ONT to OLT.

Furthermore, PON optical transceivers employed at the OLT and the ONT have differing requirements. The ONT transceiver provides burst mode transmission and continuous mode reception, while the OLT transceiver is the opposite with continuous transmission and burst mode reception.

The transceiver performance varies with time and temperature. With both time and temperature the threshold current tends to rise and the slope efficiency decreases. As a result, calibration occurring at beginning-of-life may not hold until end-of-life.

Previous attempts to account for this variation focused on single open loop and dual open loop control systems. In these modes each module is calibrated over a temperature range to create look-up tables (LUT). A look-up table entry defines points typically ranging from −40° C. to +85° C. In dual open loop control system, a value for bias and modulation current is computed at each temperature. In single open loop mode, either modulation or bias current is set with a LUT and the other parameter is set via closed loop control. A temperature sensor senses the laser temperature and determines the correct bias and/or modulation current from the look up table. These values are loaded into a laser diode driver that controls the laser. The temperature compensation typically occurs in 3 degrees Celsius increments.

These methods, however, are cumbersome and require external test equipment, in addition to extensive calibration, accurate temperature measurement, and potentially extra components such as an EEPROM and a microcontroller. Furthermore, these methods fail to account for variations due to aging. The net effect of aging is increasing bias current for the same power, variation in threshold current, and decrease in slope efficiency, thereby degrading system performance over time. In cases where the better performance is required (such as RESETless OLTs), the degradation may be more pronounced.

Another method for controlling the laser diode is called dual closed loop control. In this method, the transmitted optical signal is detected and fed back to the laser driver. The feedback signal is used to control the power level of a digital "1" and a digital "0" independently. This maintains a constant output power and extinction ratio. This method also enables setting of high extinction ratios, which is beneficial for RESETless OLTs. It also compensates for both temperature and aging effects.

The dual closed loop control method when working in a PON network has several challenges. The dual closed loop control requires a lot of data to flow before the loop can converge. In particular, it needs a pattern of 5 ones and 5 zeroes occurring repeatedly to converge. For this to occur, successful communications must be established with the OLT. This process is called ranging.

A calibration procedure and manufacturing process are required to enable successful operation and manufacture of dual loop control transceivers in a PON network. The calibration must set up the transceivers initially as a function of temperature to guarantee ranging. Furthermore, it must program the dual loop control registers so that the output power and extinction ratio are maintained within specifications, and set up the receiver so that the sensitivity is within specifications across a temperature range.

Manufacturing of a dual loop control transceiver with discrete optics for an ONT has several advantages. The cost of extra components such as the printed wiring board (PWB), connectors, microcontroller, and EEPROM may be removed. The PON SOC (system-on-a-chip) can be used for control and PON memory that already exists on the board may be used for storage. The dual loop control method accounts for aging and temperature. However, a good calibration and manufacturing method is needed that results in lower costs due to simplified calibration, minimal testing, and improved manufacturability.

Therefore, there is a need for a system and a method for calibrating optical networking equipment. Also a process is required to streamline manufacturing of these transceivers with minimal testing.

SUMMARY OF THE INVENTION

A system and method for calibrating and manufacturing a dual closed loop GPON transceiver is described that result in reduced cost through simplified calibration and minimal testing and improved manufacturability.

In an embodiment of the present invention, a method of configuring an optical transceiver is provided. A modulation current, a bias current, a first target power for a digital one and a second target power for a digital zero are calculated. Each of these values are calculated based at least in part on a temperature. Furthermore, the first target power and the second target power are calculated independently of each other. After calculating, the first target power for a digital one, the second target power for a digital zero, the modulation current, and the bias current are provided to the optical transceiver as initial values for transmitting data.

In another embodiment of the present invention, a computer program product for calibrating an optical transceiver is provided. The computer program product includes a computer readable storage medium storing computer program code for determining a first target power for transmitting a digital one, determining a second target power for transmitting a digital zero, determining a modulation current, and determining a bias current, based at least in part on a current temperature of the optics system. The first target power, the second target power, the modulation current, and the bias current are provided to the optical transceiver.

In yet another embodiment, a laser device driver is provided. The laser device driver includes a laser diode, a temperature sensor, a monitor photodiode positioned to detect light emitted from the laser diode, a laser diode driver communicatively coupled to the laser diode to control the operation of the laser diode, and a calibration controller communicatively coupled to the laser diode driver and the temperature sensor. In this embodiment, the calibration controller is configured to calculate a target power for a digital one, a target power for a digital zero, a bias current, and a modulation current based at least in part on the temperature, wherein the target power for a digital zero and the target power for a digital one are calculated independently of each other.

BRIEF DESCRIPTION OF THE DRAWINGS

For a more complete understanding of the present invention, and the advantages thereof, reference is now made to the following descriptions taken in conjunction with the accompanying drawings, in which:

FIG. 5 illustrates a manufacturing process for a dual loop control transceiver in accordance with an embodiment of the present invention.

DETAILED DESCRIPTION OF ILLUSTRATIVE EMBODIMENTS

The making and using of the presently preferred illustrative embodiments are discussed in detail below. It should be appreciated, however, that the present invention provides many applicable inventive concepts that can be embodied in a wide variety of specific contexts. The specific illustrative embodiments discussed are merely illustrative of specific ways to make and use the invention, and do not limit the scope of the invention.

The following discussion relates to embodiments of the present invention in which a dual closed loop control system is used to calibrate a laser. A first control loop controls the power when a digital zero is transmitted, and a second control loop controls the power when a digital one is transmitted. By controlling the power in the ones and zeroes independently, the extinction ratio and output power may be controlled over a temperature range and as the laser ages, both of which may cause the operating characteristics of the laser to change.

As will be discussed in greater detail below, the calibration system described herein provides initial values for use by an optical transceiver. In an embodiment, the calibration system determines the initial values for the bias current, the modulation current, the target current for transmitting a digital "1," and the target current for transmitting a digital "0." The optical transceiver utilizes these initial values to begin ranging. Because in accordance with embodiments of the present invention these initial values are determined dynamically based upon temperature, the initial values are closer to the required values and allows the ranging process to converge more quickly. Furthermore, because the initial values are determined dynamically rather than being based upon a look-up table populated upon manufacturing, the initial values may vary with age.

The calibration process disclosed herein may be performed periodically, at the occurrence of a pre-determined event (such as transmission of data), or continuously. In an embodiment, the calibration system is performed continuously wherein the initial values are continually determined based upon the current temperature of the optical transceiver. In this manner, the initial values are always available when needed by the optical transceiver.

Figure 1:
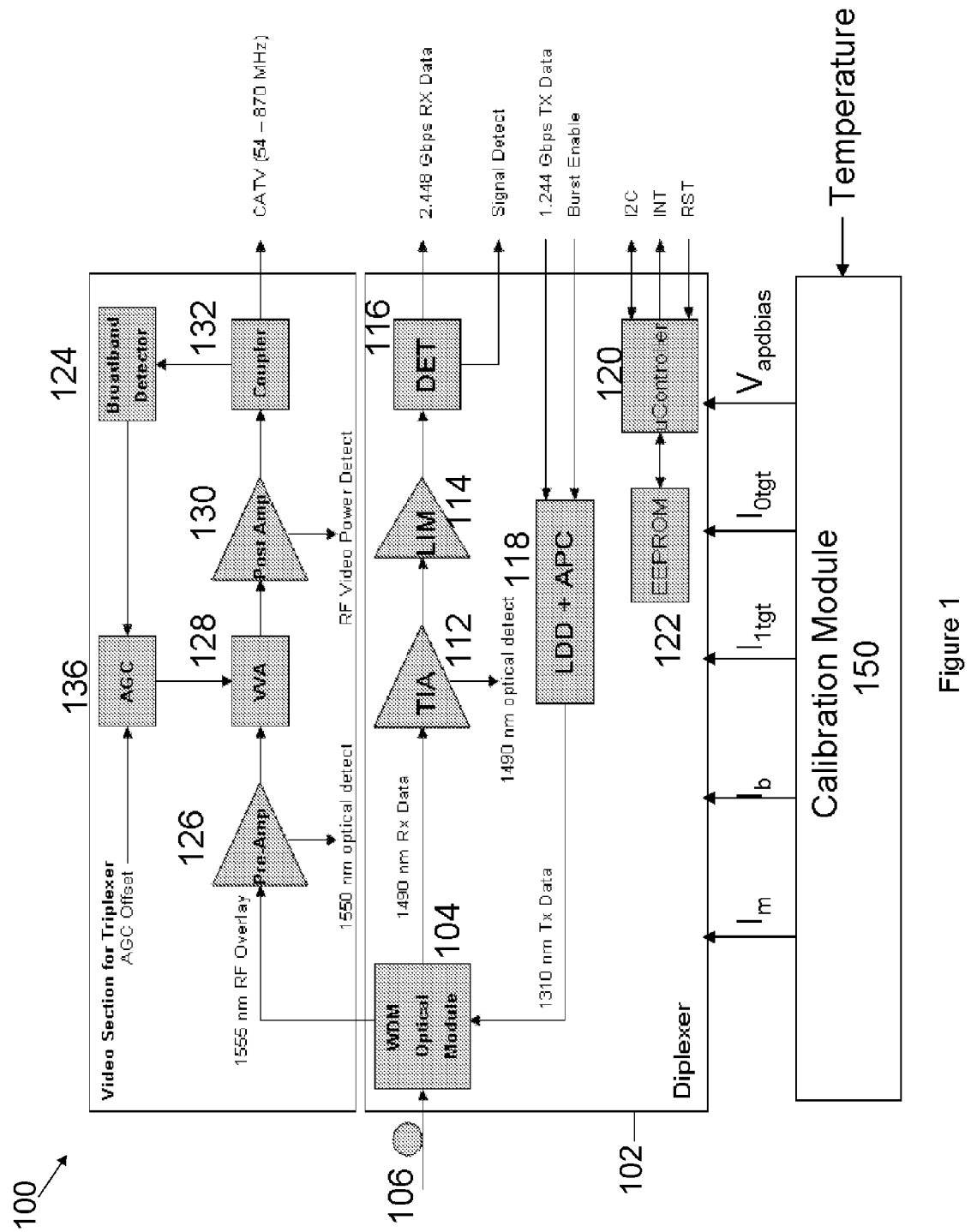
FIG. 1 is a block diagram of a transceiver in accordance with an embodiment of the present invention that shows how the calibration module interfaces with the optical interface device that comprises an LDD, limiting amplifier, and detector.

Referring first to FIG. 1, an optical transceiver 100 is shown in accordance with an embodiment of the present invention. The optical transceiver 100 includes a diplexer 102 having a wave division multiplexing (WDM) optical module 104 communicatively coupled to an optical fiber 106 to multiplex and/or demultiplex incoming and outgoing signals. In an embodiment, the WDM optical module 104 may include a planar light circuit (PLC), an optical block, or the like.

The WDM optical module 104 receives and demultiplexes a light modulated signal from the optical fiber 106 to provide a received signal to a transimpedance amplifier (TIA) 112, which in turn provides an electrical signal to a limiting amplifier (LIM) 114 for digital data detection. The signal from the LIM 114 is provided to a signal detector (DET) 116, which provides received data for use by other applications/users and a signal detect signal that indicates when data is available and/or an optical signal is present. The DET 116 may also provide a received signal strength indicator (RSSI) that provides indication of the optical signal level. In an embodiment, the received signal operates using light wavelengths of about 1490 nm wavelengths. In this embodiment, the received data is provided at a 2.448 Gbps rate.

For transmitting, the diplexer includes a laser diode driver (LDD) and automatic power control (APC) 118, which determines the bias current and modulation current to control the laser for transmission of user data via the optical fiber 106. The LDD modulates the laser to generate the upstream burst mode signal (enabled via a burst enable signal), and the APC loop maintains the correct average power out of the transmitter. An optional power leveling loop may be used to control the transmit power. In an embodiment, the LDD modulates a 1310 nm wavelength laser.

A controller 120 and memory 122 for controlling the operations and the operating states of the transmitter may also be provided. The controller 120 provides control, data storage, and health monitoring functionality for the transceiver 100 and preferably includes input/output pins to enable/disable video and data. The controller 120 may further include built-in analog-to-digital converter to monitor optical power levels and video levels, such as those illustrated in FIG. 1. The controller 120 provides, among other things, a clock signal (e.g., I2C serial digital interface), an interrupt signal, and other control/data signals, and receives, among other things, a reset signal.

The memory 122 may comprise any type of system memory, such as static random access memory (SRAM), dynamic random access memory (DRAM), synchronous DRAM (SDRAM), read-only memory (ROM), electrically-erasable programmable ROM (EEPROM), a combination thereof, or the like, suitable for storing calibration parameters, inventory information, temperature compensation data, or the like. The memory 122 may be added to a transceiver, or one can take advantage of memory present to support the GPON SOC (system-on-a-chip) thus reducing overall cost.

In other embodiments, the optical transceiver 100 may include a triplexer wherein the WDM optical module 104 also demultiplexes other signals, such as the video signal as illustrated in FIG. 1. A video receiver 124 interfaces with the WDM optical module 104 to receive a video overlay signal, such as a 1555 nm video overlay signal. In this embodiment, a pre-amp 126 receives the video overlay signal from the WDM optical module 104 and, together with a voltage variable amplifier (VVA) 128, a post-amplifier 130, and a coupler 132 provides a video signal, such as a cable television signal in the range of 54 to 870 MHz. A broadband detector 134 and an automatic gain controller (AGC) 136 provide a feedback mechanism to adjust the receiver gain as a function of the channel loading. The video receiver 124 may further provide an optical signal power signal and a video output level signal for monitoring purposes.

As will be discussed in greater detail below, a calibration module 150 provides a modulation current $I_m(T)$, a bias current $I_b(T)$, a target current for transmitting a logical one $I_{1-tgt}$, a target current for transmitting a logical zero $I_{0-tgt}$, and $V_{apdbias}(T)$ for a temperature T. These parameters are adjusted so non-return to zero (NRZ) data is transmitted such that a logical zero is characterized by minimal light and a logical one is characterized by maximum light intensity, thereby maintaining a suitable extinction ratio, which is the ratio of optical power between a logical one and a logical zero. The bias current is set such that the laser operating point is just above the threshold current for the laser. In an embodiment, the configuration parameters are provided to the LDD and APC 118 as discussed in greater detail below.

It should be noted that the optical transceiver 100 depicted in FIG. 1 is provided for illustrative purposes only, and other embodiments may have additional or fewer components. Furthermore, the illustrated components may be integrated into one or more physical elements. For example, in an embodiment, the optical transceiver 100 comprises the M02090 Laser Driver provided by MINDSPEED of Newport Beach, Calif., and the modulation current $I_m$, a bias current $I_b$, the target current for transmitting a logical one $I_{1-tgt}$, and the target current for transmitting a logical zero $I_{0-tgt}$ are provided thereto for use in controlling the laser for transmission and reception of user data.

Figure 2:
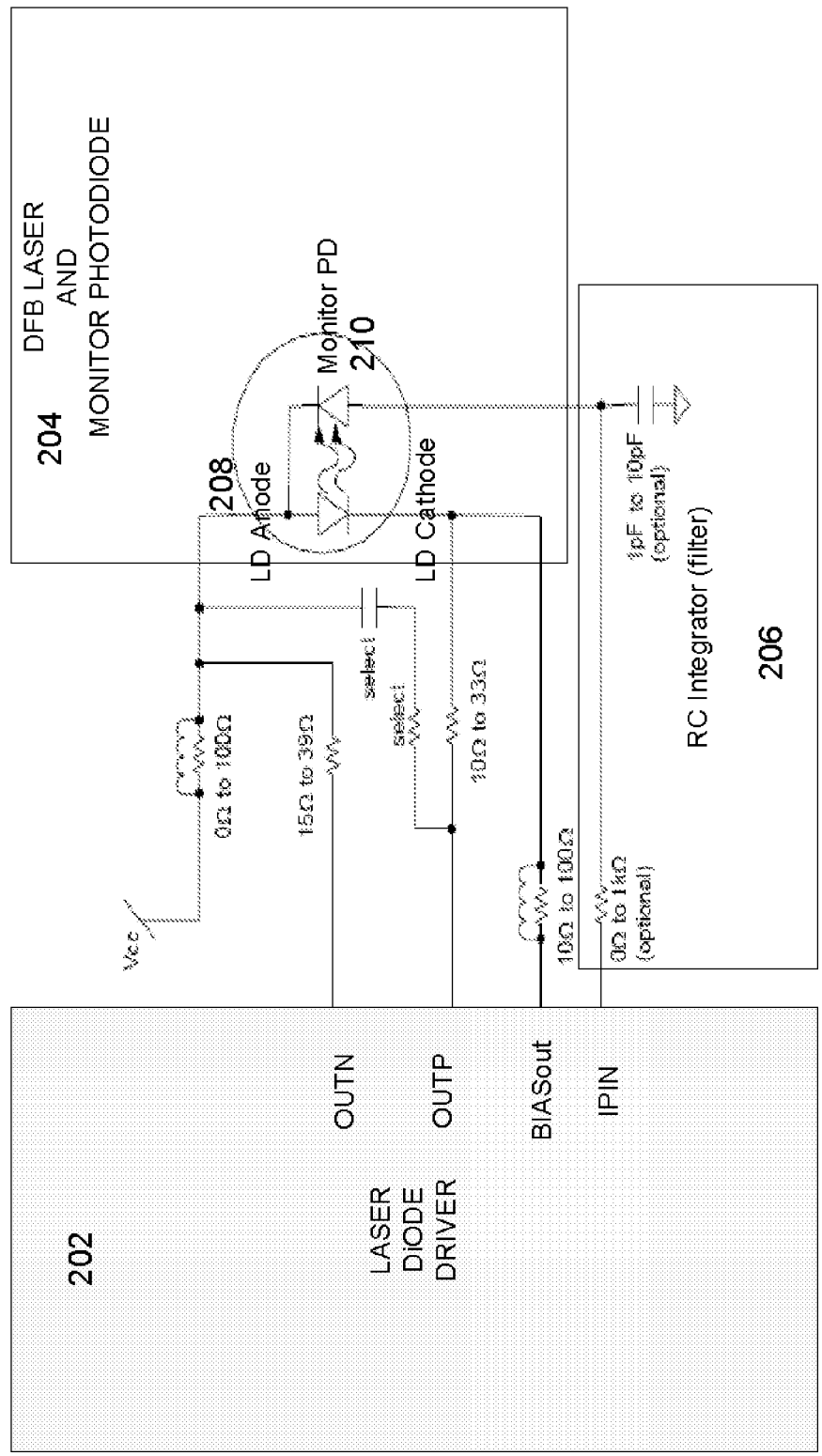
FIG. 2 is a block diagram of an interface between a laser module and a laser diode driver in accordance with an embodiment of the present invention.

FIG. 2 illustrates the interface between a LDD 202, a laser module 204, and an RC integrator 206 in accordance with an embodiment of the present invention. The LDD 202, the laser module 204, and the RC integrator 206 are integrated into one or more of the components discussed above with reference to FIG. 1. For example, the LDD 202 may be integrated into the LDD and APC 118, and the laser module 204 and RC integrator 206 may be integrated into the WDM optical module 104. In one particular embodiment, the LDD 202 comprises the M02090 Laser Driver provided by MINDSPEED of Newport Beach, Calif., and the pins discussed herein are with reference to the M02090 for illustrative purposes only.

As illustrated in FIG. 2, the laser module 204 includes a laser diode 208 having a laser diode anode and a laser diode cathode. A portion of light generated by the laser diode 208 is detected at a monitor photodiode 210, which provides a current representative of the power generated by the laser diode 208. The current generated by the monitor photodiode 210 is provided to the LDD 202 on an input power pin (IPIN) via an RC integrator 206. The integrated waveform from the monitor photodiode 210 is sampled by the LDD 202 and used to adjust the bias current and modulation current on the BIASout pin and the OUTN/OUTP pins, respectively, to maintain a given output power and extinction ratio. The OUTN and OUTP pins are coupled to the laser diode anode and cathode, respectively and provide the analog (AC) signal that is proportional to the digital input. In this manner, the optical output power and extinction ratio are kept substantially constant.

One of ordinary skill in the art will appreciate that FIG. 2 illustrates a control loop. The LDD 202 sets the modulation current and the bias current for the laser diode 208. The effect of the modulation current and the bias current are detected by the monitor photodiode 210 and are provided to the LDD 202. The LDD 202 uses the current detected by the monitor photodiode 210 to adjust the modulation current and the bias current for the laser diode 208.

In an embodiment, the LDD 202 is provided calibration data for the bias current $I_b(T)$, the modulation current $I_m(T)$, the target current for transmitting a logical one $I_{1-tgt}$, and the target current for transmitting a logical zero $I_{0-tgt}$. The LDD 202 uses the bias current $I_b$ to set the value on the BIASout pin and uses the modulation current $I_m$ to set the value on the OUTN and OUTP pins. The target current for transmitting a logical one $I_{1-tgt}$ and the target current for transmitting a logical zero $I_{0-tgt}$ are used by the LDD 202 to generate the transmitted waveform. The LDD 202 includes a control algorithm that uses these values to generate values of modulation current and bias current that maintain the correct power level and extinction ratio. A method of determining these values in accordance with an embodiment of the invention is described below.

Figure 3:
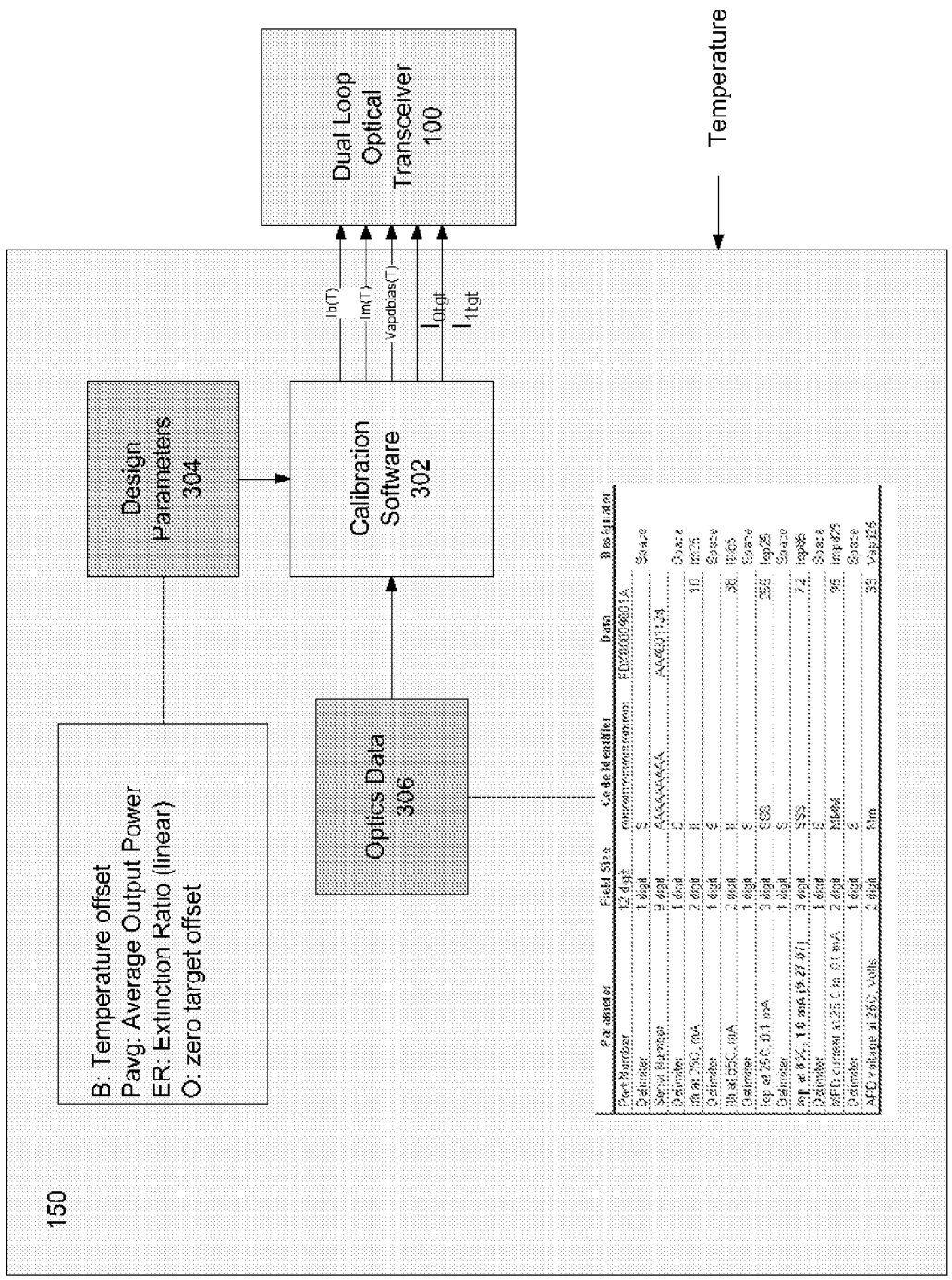
FIG. 3 illustrates a calibration process in accordance with an embodiment of the present invention.

FIG. 3 illustrates a calibration process that may be used in accordance with an embodiment of the present invention. Optics data 306 is preferably obtained from the manufacturer of the optical device and input to memory where the optics data 306 are available to the calibration software 302. The design parameters 304 are selected by the systems designer, and may include an extinction ratio (ER), a reference power, an average power, functions of the system such as temperature and temperature offset, and the like. The design parameters may be included in memory or determined real time. Together, these data are used to compute $I_b(T)$, $I_m(T)$, $I_{1-tgt}$, $I_{0-tgt}$, and $V_{apd}(T)$. The optics data 306 illustrated in FIG. 3 is provided for illustrative purposes only and may vary. In an embodiment, the optics data includes a threshold current ($I_{th}$) at 25° C. and 85° C., an operating current ($I_{op}$) at 25° C. and 85° C., a monitor photodiode (MPD) current at a given output power ($I_{mpd}$) and 25° C., and a MPD current ratio at 85° C. ($K_{mpdse}$).

Figure 4:
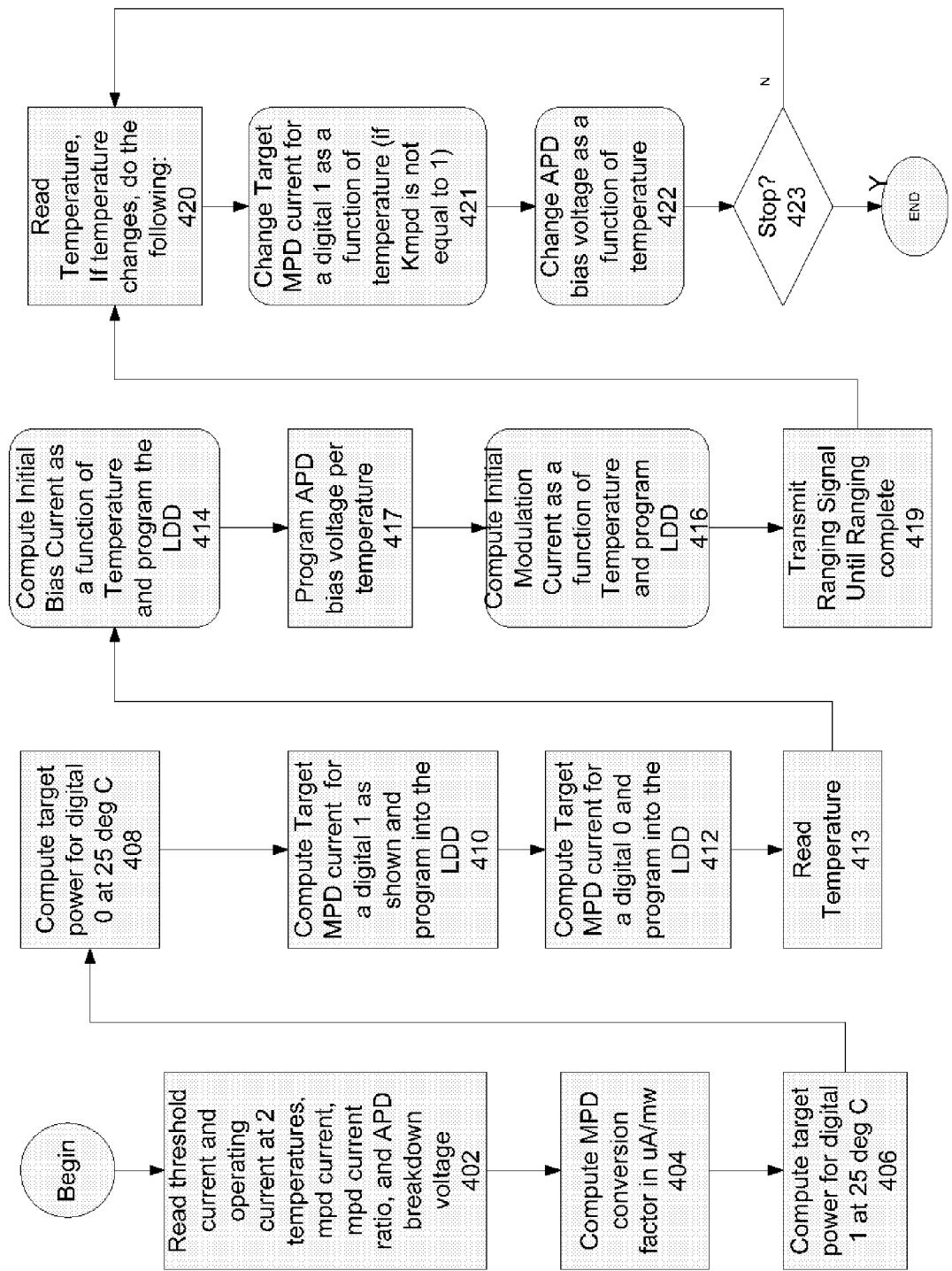
FIG. 4 is a flow chart for calibrating an optical transceiver in accordance with an embodiment of the present invention.

FIG. 4 is a flow chart depicting a process of determining the bias current $I_b(T)$, the modulation current $I_m(T)$, the target current for transmitting a logical one $I_{1-tgt}$, and the target current for transmitting a logical zero $I_{0-tgt}$ in accordance with an embodiment of the present invention. In an embodiment the process depicted in FIG. 4 is performed by the calibration module 150 (see FIG. 1). The process begins in step 402, wherein initial values for the threshold current ($I_{th}$) at 25° C. and 85° C., operating current ($I_{op}$) at 25° C. and 85° C., monitor photodiode (MPD) current at a given output power ($I_{mpd}$) at 25° C., and the MPD current ratio at 85° C. ($K_{mpdse}$) are determined. One of ordinary skill in the art will appreciate that these values are dependent upon the laser and, accordingly, may vary from laser to laser. Generally, these values are determined when the laser is manufactured and may be obtained by a user or system administrator entering the values directly into the calibration system, such as into the memory 132 of FIG. 1. Preferably, however, the values are encoded onto a bar code associated with the laser provided by the manufacturer of the laser module 202 and are subsequently read and placed into memory 132 by scanning the bar code during assembly or installation. Additionally, the data includes the APD bias voltage at 25° C. The APD bias voltage is used to calculate an APD bias voltage at an operating temperature since the function is substantially linear and the slope may be determined in advance. In an embodiment such as that described above, the APD slope of the APD bias voltage over a range of temperatures is approximately 0.0675 V per degree C.

In step 404, a conversion factor for the current through the monitor photodiode 206 at a given power is determined. In an embodiment, conversion factor for the current through the monitor photodiode 210 is determined by the following equation.

$$K_{mpd} = \frac{I_{mpd}}{P_R}$$

wherein $K_{mpd}$ represents the current conversion factor from the current through the monitor photodiode 210 for a specified power level;

$I_{mpd}$ represents the current through the monitor photodiode 210 at a given power level at a given temperature; and $P_r$ represents a reference power level.

The reference power $P_r$ is a design parameter that is chosen to be close to the desired power level. In an embodiment, the specification for power is 0.5 dBm to 4 dBm and typically a value close to 3 dBm or 2 mW is chosen.

A target power for transmitting a digital one $P_1$ and a digital zero $P_0$ is determined in steps 406 and 408, respectively. In an embodiment, the target power for a digital one $P_1$ and the target power for a digital zero $P_0$ are determined according to the following equations. The calibration system uses these values to determine a bias current $I_b$ and a modulation current $I_m$ that are in turn used to initialize the laser device driver such that the actual P1 and Po out of the laser are held constant.

$$P_1 = 2 * P_{avg}$$
$$P_0 = \frac{P_1}{ER}$$

wherein $P_1$ represents the target power for transmitting a digital one;

$P_0$ represents the target power for transmitting a digital zero;

$P_{avg}$ represents the average power; and

ER represents the extinction ratio on a linear scale (e.g., 17 dB ER is approximately 50 on a linear scale).

The average power $P_{avg}$ and the extinction ratio ER are design parameters and may be set or adjusted to accurately reflect the system characteristics.

In steps 410 and 412, the target current flowing through the monitor photodiode 210 when transmitting a logical one and a logical zero, respectively, is determined at 25° C. The following equations may be used.

$$I_{1\text{-}tgt} = P_1 * K_{mpd}$$

$$I_{0\text{-}tgt} = P_0 * K_{mpd} + O$$

wherein $I_{1\text{-}tgt}$ represents the target current through the monitor photodiode 210 when transmitting logical one;

$I_{0\text{-}tgt}$ represents the target current through the monitor photodiode 210 when transmitting logical zero;

$P_1$ represents the target power for transmitting a digital one;

$P_0$ represents the target power for transmitting a digital zero;

$K_{mpd}$ represents the current conversion factor from the current through the monitor photodiode 210 for a specified power level; and O represents an offset for loop stability.

It should be noted that the offset O may vary from device to device.

The system temperature is read from a temperature sensor near the optics in step 413. The processing proceeds to steps 414 and 416, wherein the initial bias current $I_b$ and the initial modulation current $I_m$, respectively, are determined. In an embodiment, the bias current $I_b$ is set equal to the threshold current $I_{th}$ discussed above. Studies have found, however, that the initial bias current $I_b$ may vary depending upon the temperature. Because a large variance between the initial bias current and the bias current used in a steady state may increase the time for the laser system to reach a steady operating state, the initial bias current $I_b$ and the initial modulation current $I_m$ may be determined based upon the temperature of the laser system. The dual loop control system cannot close the loop without sufficient data flow. Data flow cannot occur unless the ranging process is completed, and the ranging process cannot complete without a good transmitted waveform. The initial transmitted waveform is a function of the $I_m$ and $I_b$ settings, and therefore, it may be desirable to set the $I_m$ and $I_b$ values accurately as a function of temperature. The initial bias current $I_b$ may be determined in an embodiment based upon the temperature according to the following equation.

$$I_b = A * e^{k*(T-B)}$$

wherein $I_b$ represents the initial bias current at temperature T;

T represents the current temperature of the laser system;

B represents a temperature bias to account for a temperature difference between the temperature sensor and the optical equipment; and A and K represent mathematical constants to curve fit to an exponential transfer function as defined above.

The values for the constants A and K may be determined from the calibration data, which is preferably included in the bar code data as discussed above. In particular, the calibration data preferably includes the initial bias current for given temperatures, such as the initial bias current at 25° C. and 85° C. From these known values for the initial bias current at given temperatures, the above equation may be used to solve for constants A and K. For example, assuming that from the calibration data that the initial bias current $I_b$ is 10 mA at temperature 25° C. and is 44 mA at temperature 85° C., then constants A and K can be calculated as 5.393798 and 0.024693, respectively. These values may then be used in the above equation wherein T is the current temperature and the temperature offset B, for example, is 20° C.

It should be noted that some laser drivers may have a DC component in the modulation current and it may be desirable to subtract the DC component in the calculation of the initial bias current $I_b$. The bias may be determined experimentally and included in the initial configuration parameters.

Similarly, the modulation current $I_m(T)$ may be determined in an embodiment based upon the temperature according to the following equation.

$$I_m = A * e^{k*(T-B)}$$

wherein $I_m$ represents the initial modulation current at temperature T;

T represents the current temperature of the laser system;

B represents a temperature bias to account for errors in the temperature sensor;

A and K represent mathematical constants for curve fitting an exponential transfer function.

Similar to the initial bias current $I_b$, the values for constants A and K may also be determined from the calibration data, which is preferably included in the bar code data as discussed above. In particular, the calibration data preferably includes the initial modulation current for given temperatures, such as the initial modulation current at 25° C. and 85° C. From these known values for the initial modulation current at given temperatures, the above equation may be used to solve for constants A and K. The initial modulation current at operating temperatures 25° C. and 85° C. may be determined according to the following equations. Depending on the characteristics of the LDD, the threshold current may be specified at an output power of 1 uW or 10 uW. In this implementation, the power is specified at 1 uW.

$$I_m(T=25) = \left(\frac{P_0}{P_R}\right) * 2 * (I_{op}(T=25) - I_{th}(T=25))$$

$$I_m(T=85) = \left(\frac{P_0}{P_R}\right) * 2 * (I_{op}(T=85) - I_{th}(T=85))$$

wherein $I_m$ represents the initial modulation current;

$I_{op}$ represents the operating current of the laser system;

T represents the current temperature of the laser system;

$P_0$ represents the target power for transmitting a digital zero; and $P_R$ represents a reference power level.

Using these known values for $I_m$, the values for constants A and K may be determined using the exponential equation. For example, assuming that from the calibration data that the operating current $I_{op}$ is 20.3 mA and the threshold current $I_{th}$ is 5 mA at 25° C., then the initial modulation current $I_m$ at 25° C. is 24.66 mA. Also assuming that from the calibration data that the operating current $I_{op}$ and the threshold current $I_{th}$ at 85° C. is 66.6 mA and 22 mA, respectively, then the initial modulation current $I_m$ at 85° C. is 83.39 mA. Using these values for the initial modulation current $I_m$ at 25° C. and 85° C., the above equation may be used to solve for constants A and K, which in this case calculates to be 14.841 and 0.0203, respectively.

In 417 the APD bias voltage is set so that the downstream data arriving on, e.g., the 1490 nm wavelength, meets the system sensitivity requirements. This is done initially in order to establish communications with the OLT and start the ranging process. The APD bias voltage may be initialized in a manner similar to that discussed below with reference to step 422, which determines the APD bias voltage within a loop. This is a function of temperature and is based on the temperature read in step 413. When the system establishes communication with the OLT, the ONT will go to Standby and is ready for ranging. In step 419, the ONT will range with the OLT until communications is established. Then a control loop will be started where the temperature is read continually as indicated in step 420 (as an example once a second) until there is a change.

In step 420, the current temperature of the laser system is read from the device until it changes. In step 421, a new $I_{1-tgt}$ is determined based upon the temperature. The $I_{1-tgt}$ value determined above was an initial value for $I_{1-tgt}$. As the temperature of the device changes, the $I_{1-tgt}$ is preferably recalculated to reflect the different operating characteristics of the device. In an embodiment, the $I_{1-tgt}$ is recalculated according to the following equation.

$$I_{1-tgt} = P_0\left[\left(-K_{mpd} * T * \left(\frac{1-K_{mpdse}}{60}\right)\right) + \left(K_{mpd} * \left(\frac{3.4 - K_{mpdse}}{2.4}\right)\right)\right]$$

wherein $I_{1-tgt}$ represents the target MPD current at temperature T;

$P_0$ represents the target power for a digital zero;

T represents the temperature of the laser system;

$K_{mpd}$ represents the current conversion factor from the current through the monitor photodiode 210 for a specified power level; and $K_{mpdse}$ represents the fraction of $K_{mpd}$ at 85° C.

The above equation represents a linear function that passes through points where $I_{mpd} = K k_{mpd} * P_o$ at 25° C. and $I_{mpd} = K_{mpd} * P_o * K_{mpdse}$ at 85° C. In the case where the slope is 1, the equation reduces to $P_o * K_{mpd}$ at all temperatures.

Thereafter, in step 422, the photodiode in the receiver may be configured. It has been found that the receiving photodiode, such as an avalanche photo diode (APD), may also be affected by the temperature and age of the device. Accordingly, techniques discussed above with reference to the modulation and bias currents may also be applied to calculate an APD voltage bias. In an embodiment, the APD voltage bias may be determined according to the following equation.

$$V_{apdbias} = C_1 * (T - B + V_{bapd25} - C_2)$$

wherein $V_{apdbias}$ represents the APD voltage bias at temperature T;

T represents the current temperature of the laser system;

B represents a temperature bias to account for a difference between the temperature sensor and the optics;

$V_{badp25}$ represents the breakdown voltage of the APD at 25° C.;

$C_1$ is a constant and represents the rate of change of the breakdown voltage as temperature varies; and $C_2$ is a constant and represents how far below the breakdown voltage the device operates.

The value of $V_{badp25}$ is preferably provided by the manufacturer, and even more preferable is included in the bar code data discussed above. The value of $C_1$, the slope of the breakdown voltage versus the temperature, is preferably experimentally determined as an average of multiple devices. In an embodiment, the value of $C_2$, which is used to adjust the operating point to a fixed offset (e.g., 2.5V) below the breakdown voltage, is 4.5 V. It should be noted that these values may be different based upon the particular type of photodiode as well as the particular manufacturer. The transceiver is preferably design to operate continuously. A stop can be triggered, for example, by power down or fiber disconnect or other types of RESETs.

The process described above may be performed at various times during the life cycle of the laser system. For example, in an embodiment, the calibration process described above is performed at manufacturing and/or installation time. In this embodiment, the process may be used to populate a look-up table for use later. In another embodiment, the process is performed periodically such that differences due to age are taken into account. In yet another embodiment, the process may be performed prior to transmitting/receiving data, which provides an even more dynamic calculation and response to changes in the operating characteristics due to temperature and age.

One of ordinary skill in the art will appreciate that the calibration process described above provides many advantages, including eliminating human error in entering the data and saving time. For example, the dual closed loop process described above uses limited manufacturer data to determine the operating points of a laser. In embodiments in which the laser data from the manufacturer is included on a bar code, the data may be entered into the calibration system and the optical transceiver calibrated quickly. Furthermore, the dual closed loop calibration achieved with minimal external equipment. A high-speed optical scope may be used for verification if desired, but may not be necessary, particularly once process is verified. This process may be performed with little or no additional time during the manufacturing process, and the calibration time is shortened because manual entry of a temperature-dependent look-up table is not required. The APD supply voltage may be similarly recorded, read, and programmed.

One of ordinary skill in the art will appreciate that embodiments of the present invention may be utilized in multiple situations. For example, in an embodiment the procedure is performed in a factory for calibration purposes to determine and set values stored in memory for use during operations. In another embodiment, the procedure discussed above may be performed in real-time during the live operation of the laser equipment to send and receive data, thereby accounting for the temperature and aging effects. In yet another embodiment, the procedure discussed above is performed each time the laser begins to initiate a transmitting/receiving user data. In this manner, embodiments of the present invention may be used to more accurately set the initial values for the bias current and the modulation current in order to achieve a better soft start, wherein the waveform is close to the correct output power and extinction ratio at start up.

FIG. 5 demonstrates how this process may be used to manufacture ONT transceivers at the factory. In step 500, the printed wiring board (PWB) is manufactured with the software and memory loaded with the system configuration. In 502, the optics data is scanned. In step 505, the calibration module calibrates the transceiver with the process described above. It also changes the calibration parameters as a function of temperature as described in above in step 401, preferably real-time. In step 507, the ONT is tested to ensure that the correct output power, waveform, and extinction ratio are achieved.

It should be noted that the above process used calibration temperatures 25° C. and 85° C. for illustrative purposes only, and that other embodiments may utilize different temperatures.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular illustrative embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding illustrative embodiments described herein may be utilized according to the present invention. Accordingly, the appended claims are intended to include within their scope such processes, machines, manufacture, compositions of matter, means, methods, or steps.

What is claimed is:

1. A method of configuring an optical transceiver, the method comprising:
    calculating a first target current for transmitting a digital one;
    calculating a second target current for transmitting a digital zero;
    calculating a modulation current;
    calculating a bias current, wherein each of the calculating the first target current for transmitting a digital one, the calculating the second target current for transmitting a digital zero, the calculating a modulation current, and the calculating the bias current are based at least in part on a temperature, and wherein the calculating the first target current and the calculating the second target current are independent of each other, wherein the calculating the modulation current and the calculating the bias current is performed at least in part by subtracting a bias from the temperature; and
    providing the first target current for transmitting a digital one, the second target current for transmitting a digital zero, the modulation current, and the bias current to the optical transceiver as initial values for transmitting data.

2. The method of claim 1, wherein the bias represents an approximation of a difference between a temperature sensor and a laser.

3. The method of claim 1, wherein the modulation current and the bias current are calculated during installation of the optical transceiver.

4. The method of claim 1, further comprising reading constant values from a bar code, the constant values being used in the calculating of one or more of the first target current, the second target current, the modulation current, and the bias current.

5. The method of claim 4, wherein the constant values include one or more of a threshold current, an operating current, and a monitor photodiode current at a predetermined temperature.

6. The method of claim 1, further comprising calculating a voltage bias of a photodiode based at least in part on the temperature.

7. A computer program product embedded in a computer readable storage medium and executable by a processor for calibrating an optical transceiver comprising:
    computer program code for retrieving a monitor photodiode current for a predetermined temperature, the monitor photodiode current for the predetermined temperature being a constant for a particular laser device;

computer program code for determining a first target current for transmitting a digital one based at least in part on a current temperature of an optics system and the monitor photodiode current;

computer program code for determining a second target current for transmitting a digital zero based at least in part on the current temperature of the optics system and the monitor photodiode current, the second target current being determined independently of the first target current;

computer program code for determining a modulation current based at least in part on the current temperature of the optics system;

computer program code for determining a bias current based at least in part on the current temperature of the optics system; and computer program code for providing the first target current, the second target current, the modulation current, and the bias current to the optical transceiver.

8. The computer program product of claim 7, wherein the computer program code for determining the modulation current includes computer program code for subtracting a bias from the current temperature, the bias representing an approximation of a difference between a temperature sensor and a laser.

9. The computer program product of claim 7, further comprising computer program code for reading constant values from a bar code, the constant values being used in the determining of one or more of the first target current, the second target current, the modulation current, and the bias current.

10. The computer program product of claim 9, wherein the constant values include one or more of a threshold current, an operating current, and the monitor photodiode current at the predetermined temperature.

11. The computer program product of claim 7, further comprising computer program code to cause the computer program code for determining the first target current, the second target current, the modulation current, and the bias current periodically.

12. The computer program product of claim 7, further comprising computer program code for determining a photo diode voltage bias based at least in part on the current temperature.

13. A laser device driver comprising:
a laser diode;
a temperature sensor positioned to detect a temperature;
a monitor photodiode positioned to detect light emitted from the laser diode;
a laser diode driver communicatively coupled to the laser diode to control the operation of the laser diode; and
a calibration controller communicatively coupled to the laser diode driver and the temperature sensor, the calibration controller configured to calculate a target current for transmitting a digital one, a target current for transmitting a digital zero, a bias current, and a modulation current based at least in part on the temperature, the target current for transmitting a digital zero and the target current for transmitting a digital one being calculated independently of each other and being based at least in part on a monitor photodiode current at a predetermined temperature, the monitor photodiode current being a factory setting.

14. The laser device driver of claim 13, wherein the temperature sensor detects the temperature of the laser diode driver.

15. The laser device driver of claim 13, wherein the calibration controller calculates the bias current and the modulation current by at least in part subtracting a bias temperature to account for a difference in temperature between the temperature sensor and laser diode.

16. The laser device driver of claim 13, further comprising a bar code, the bar code including one or more of a threshold current, an operating current, and a monitor photodiode current at a predetermined temperature.

17. The laser device driver of claim 16, wherein the calibration controller is further configured to perform one or more calculations using values obtained from the bar code.

18. The laser device driver of claim 13, wherein the calibration controller is configured to calculate the modulation current and the bias current prior to transmitting data.

* * * * *